(12) United States Patent
Foster

(10) Patent No.: US 11,230,928 B1
(45) Date of Patent: Jan. 25, 2022

(54) GUIDE VANE WITH TRUSS STRUCTURE AND HONEYCOMB

(71) Applicant: Raytheon Technologies Corporation, Farmington, CT (US)

(72) Inventor: Larry Foster, South Glastonbury, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 0 days.

(21) Appl. No.: 16/936,043

(22) Filed: Jul. 22, 2020

(51) Int. Cl.
*F01D 5/14* (2006.01)
*F01D 5/18* (2006.01)
*B33Y 80/00* (2015.01)

(52) U.S. Cl.
CPC .............. *F01D 5/147* (2013.01); *F01D 5/18* (2013.01); *B33Y 80/00* (2014.12); *F05D 2230/23* (2013.01); *F05D 2240/126* (2013.01); *F05D 2240/301* (2013.01); *F05D 2250/191* (2013.01); *F05D 2250/283* (2013.01); *F05D 2300/603* (2013.01)

(58) Field of Classification Search
CPC . F01D 5/147; F01D 5/18; F01D 5/282; F01D 5/34; F01D 5/16; F01D 5/28; F01D 9/02; F01D 25/005; B33Y 80/00; F05D 2220/36; F05D 2230/23; F05D 2240/12; F05D 2240/126; F05D 2240/301; F05D 2250/191; F05D 2250/283; F05D 2260/96; F05D 2300/603; F05D 2300/615; F04D 29/324; F04D 29/667; F04D 29/664; F02K 1/827; F02C 7/24
See application file for complete search history.

(56) References Cited

U.S. PATENT DOCUMENTS

| | | | |
|---|---|---|---|
| 3,644,059 A * | 2/1972 | Bryan | F01D 5/183 416/97 R |
| 7,334,998 B2 | 2/2008 | Jones et al. | |
| 7,607,287 B2 | 10/2009 | Reba et al. | |
| 7,980,817 B2 * | 7/2011 | Foose | F01D 5/147 415/191 |
| 8,177,513 B2 * | 5/2012 | Shim | B23P 15/04 416/223 A |
| 8,573,948 B2 * | 11/2013 | Jevons | F01D 9/041 416/233 |
| 8,585,368 B2 * | 11/2013 | Viens, V | F04D 29/324 416/191 |
| 9,359,901 B2 * | 6/2016 | Evans | F01D 5/147 |

(Continued)

FOREIGN PATENT DOCUMENTS

| | | |
|---|---|---|
| GB | 2361035 | 10/2001 |
| GB | 2471845 | 1/2011 |
| WO | 2005100753 | 10/2005 |

*Primary Examiner* — J. Todd Newton
*Assistant Examiner* — Eric J Zamora Alvarez
(74) *Attorney, Agent, or Firm* — Carlson, Gaskey & Olds, P.C.

(57) ABSTRACT

A vane includes an airfoil that defines a leading edge, a trailing edge, a pressure side, and a suction side. The airfoil includes a truss structure that has ribs that define there between a plurality of through-cavities from the pressure side to the suction side. Honeycomb cells are disposed in the cavities. A face sheet defines at least one of the pressure side or the suction side. The face sheet has perforations that correspond in location to the honeycomb cells.

20 Claims, 4 Drawing Sheets

(56) References Cited

U.S. PATENT DOCUMENTS

| | | | |
|---|---|---|---|
| 9,932,842 B2 | 4/2018 | Hyatt et al. | |
| 10,107,191 B2 | 10/2018 | Gilson et al. | |
| 2013/0000247 A1* | 1/2013 | Sypeck | B32B 3/12 |
| | | | 52/793.1 |
| 2015/0034604 A1* | 2/2015 | Subramanian | B23K 26/0006 |
| | | | 219/73.21 |
| 2017/0292530 A1* | 10/2017 | Pope | F01D 5/282 |
| 2019/0178092 A1* | 6/2019 | Pearson | F01D 5/28 |
| 2020/0103139 A1 | 4/2020 | Schiller et al. | |

* cited by examiner

GUIDE VANE WITH TRUSS STRUCTURE AND HONEYCOMB

BACKGROUND

A gas turbine engine typically includes a fan section, a compressor section, a combustor section, and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

The fan may be disposed in a bypass fan duct. Downstream from the fan there may be exit guide vanes that facilitate flow of exit air from the fan duct.

SUMMARY

A vane according to an example of the present disclosure includes an airfoil that defines a leading edge, a trailing edge, a pressure side, and a suction side. The airfoil includes a truss structure that has ribs that define there between a plurality of through-cavities from the pressure side to the suction side, honeycomb cells disposed in the cavities, and a face sheet that defines at least one of the pressure side or the suction side. The face sheet has perforations corresponding in location to the honeycomb cells.

In a further embodiment of any of the foregoing embodiments, the truss structure is a reinforced polymer.

In a further embodiment of any of the foregoing embodiments, the honeycomb is adhesively secured in the airfoil.

In a further embodiment of any of the foregoing embodiments, the honeycomb and the truss structure are together a monolithic piece.

In a further embodiment of any of the foregoing embodiments, the face sheet is adhesively bonded to the truss structure.

In a further embodiment of any of the foregoing embodiments, the truss structure includes a recess, and the face sheet is disposed in the recess.

In a further embodiment of any of the foregoing embodiments, the cavities are 3- or 4-sided.

In a further embodiment of any of the foregoing embodiments, the face sheet is fiber reinforced polymer.

A further embodiment of any of the foregoing embodiments includes metallic or polymer end fittings.

A gas turbine engine according to an example of the present disclosure includes a fan and a fan duct, a compressor, a turbine, a combustor, and a plurality of vanes disposed in the fan duct. Each one of the vanes includes an airfoil that defines a leading edge, a trailing edge, a pressure side, and a suction side. The airfoil includes a truss structure that has ribs that define there between a plurality of through-cavities from the pressure side to the suction side, honeycomb cells disposed in the cavities, and a face sheet that defines at least one of the pressure side or the suction side. The face sheet has perforations corresponding in location to the honeycomb cells.

In a further embodiment of any of the foregoing embodiments, the truss structure and the face sheet are reinforced polymers.

In a further embodiment of any of the foregoing embodiments, the honeycomb is adhesively secured in the airfoil.

In a further embodiment of any of the foregoing embodiments, the honeycomb and the truss structure are together a monolithic piece.

In a further embodiment of any of the foregoing embodiments, the face sheet is adhesively bonded to the truss structure.

In a further embodiment of any of the foregoing embodiments, the truss structure includes a recess, and the face sheet is disposed in the recess.

A process for making a vane according to an example of the present disclosure includes fabricating an airfoil. The airfoil defines a leading edge, a trailing edge, a pressure side, and a suction side. The airfoil has a truss structure with ribs that define there between a plurality of through-cavities from the pressure side to the suction side, with honeycomb cells disposed in the cavities, and a face sheet that defines at least one of the pressure side or the suction side. The face sheet has perforations that correspond in location to the honeycomb cells.

In a further embodiment of any of the foregoing embodiments, the fabricating includes forming the truss structure and the honeycomb by additive manufacturing.

In a further embodiment of any of the foregoing embodiments, the fabricating includes bonding the face sheet to the truss structure.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
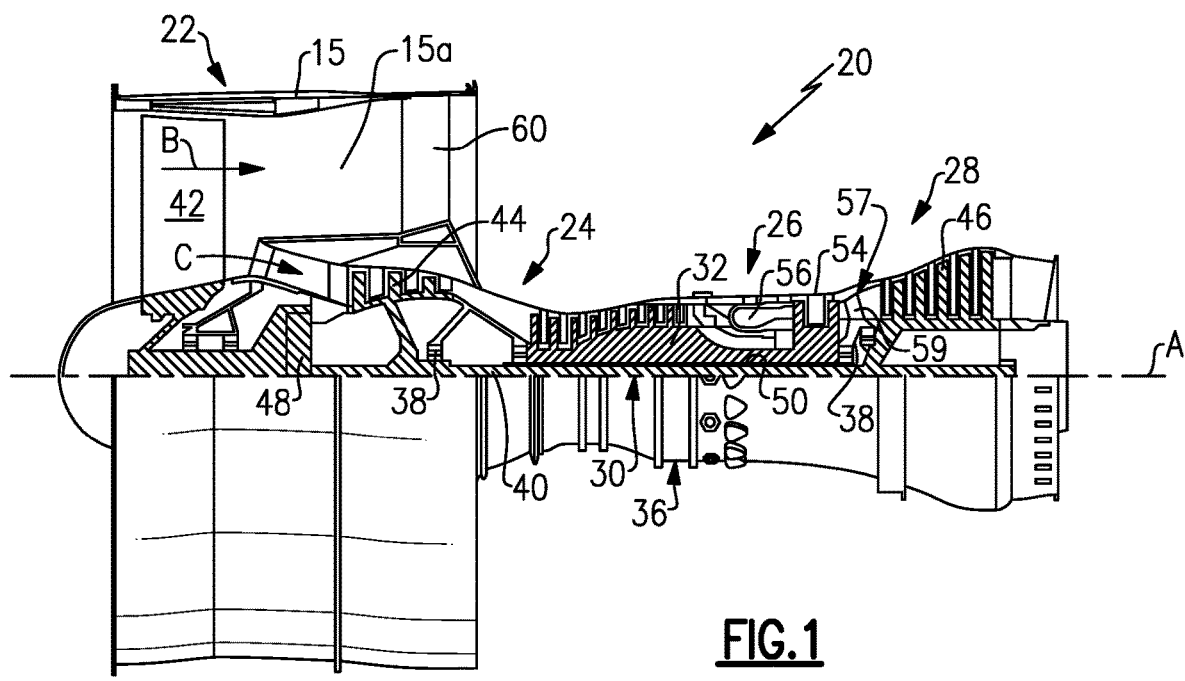
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass fan duct 15a defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second (350.5 meters/second).

Figure 2:
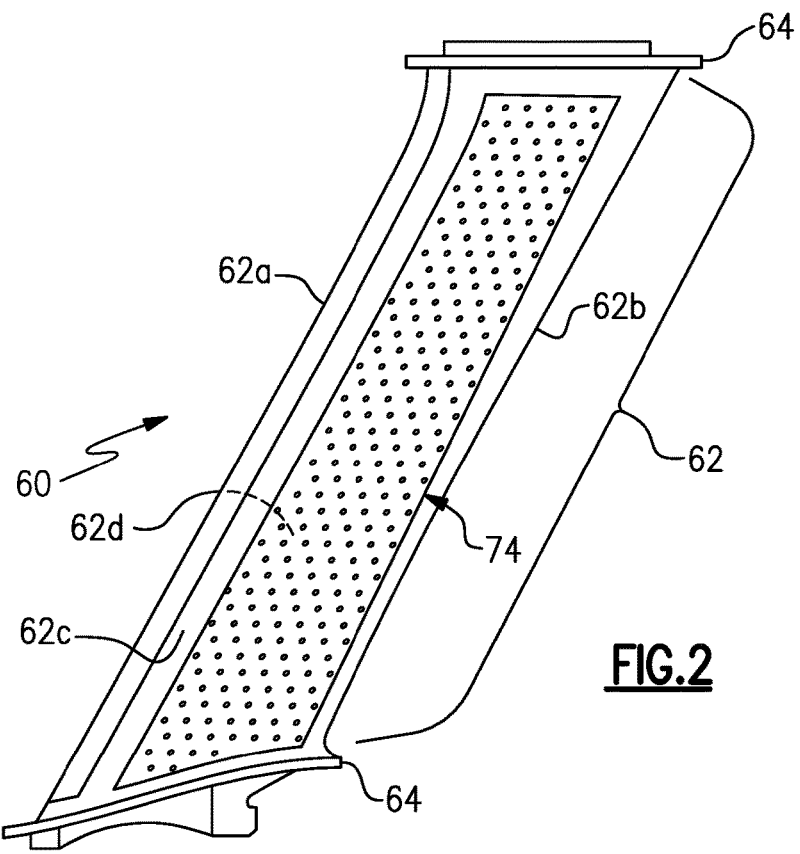
FIG. 2 illustrates a guide vane from the engine.

At the exit of the fan duct 15a there is a circumferential row of exit guide vanes 60. A representative one of the guide vanes 60 is depicted in FIG. 2. As will be described, the guide vane 60 is configured with an acoustic treatment design to facilitate the mitigation of audible acoustic frequencies, namely those produced by operation of the engine 20.

The vane 60 includes an airfoil 62 that generally spans between radially inner and outer ends. In this example, the radial ends are received in respective fittings 64 that are configured to secure the vane 60 in the engine 20 (e.g., to the case 15 or other structure). For high strength and light weight, the fittings 64 may be formed of titanium alloy or fiber reinforced polymer, for example, but other light-weight and high strength alloys may also be used.

Figure 3:
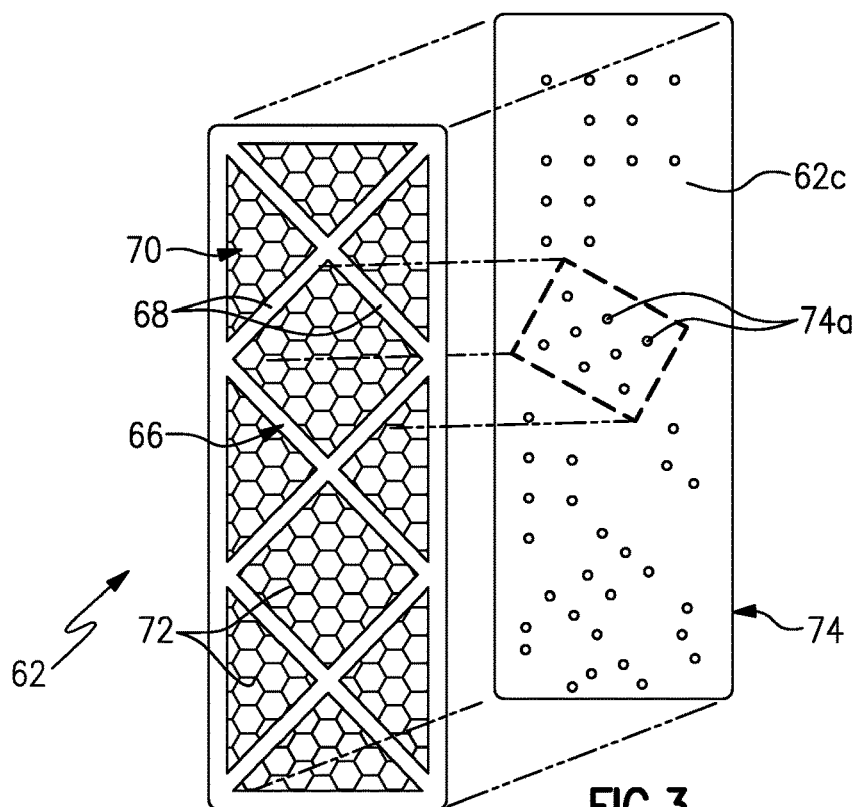
FIG. 3 illustrates an expanded view of the guide vane.

The airfoil 62 defines a leading edge 62a, a trailing edge 62b, and suction side 62c, and a pressure side 62d (backside in the figure). FIG. 3 illustrates a partially expanded view of the airfoil 62, with a portion of the suction side 62c removed. The airfoil 62 includes a truss structure 66 that is formed by interconnecting ribs 68. The ribs 68 define through-cavities 70 there between. The through-cavities 70 extend uninterrupted from the suction side 62c to the pressure side 62d. In general, the ribs 68 are spaced relatively far apart so as to form a limited number of the through-cavities 70. In the example, shown, there are ten through-cavities 70. The through-cavities 70 in this example are generally 3- or 4-sided. In the fully assembled vane 60, the ribs 68 are internal, although the truss structure 66 may form portions of the external surface of the airfoil 62, such as the leading end 62 and trailing edge 62b.

There are honeycomb cells 72 disposed in the through-cavities 70. As depicted, the honeycomb cells 72 are hexagonal in cross-section and have sides of equal length and equal interior angle. Alternatively, to adapt acoustic performance, the cells 72 may have sides of unequal length and unequal interior angle or have other geometries or sizes, such as but not limited to, other regular or irregular polygonal geometries or circular geometries. Each honeycomb cell 72 is defined by a closed-perimeter side wall, and the ends of the honeycomb cells are closed off by the suction and pressure sides 62c/62d. The side walls of the honeycomb cells 72 are formed of a light-weight material, such as but not limited to, polymer, fiber-reinforced polymer, or metallic alloy (e.g., aluminum).

A face sheet 74 defines at least a portion of at least one of the pressure side 62d or the suction side 62c and closes off an end or ends of the honeycomb cells 72. In some examples, both the pressure side 62d and the suction side 62c have face sheets 74. One or both of the face sheets 74 have perforations 74a (through-holes) that correspond in location to the honeycomb cells 72. For instance, in some example there may be is a one-for-one relationship such that each perforation 74a opens into one honeycomb cell 72 and is substantially aligned over the center of its corresponding honeycomb cell 72. The face sheet 74 is formed of a reinforced polymer, such as but not limited to, a laminated continuous fiber polymer matrix composite, a short fiber polymer matrix composite, or a particle-reinforced (e.g., glass or carbon) polymer matrix composite. The perforations 74a may be formed after fully forming (e.g., curing) the face sheet 74, or alternatively during the process of fabricating the face sheet 74. For instance, pins may be inserted through the face sheet 74 prior to curing. The face sheet 74 is then cured and the pins removed, leaving the perforations 74a in their place.

Figure 4:
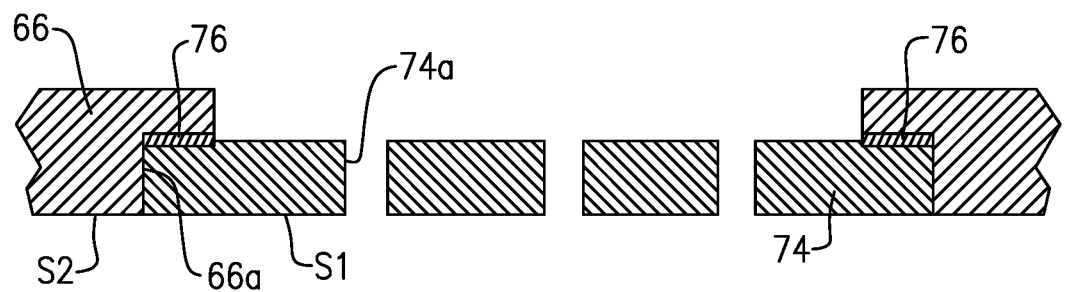
FIG. 4 illustrates a sectioned view of a portion of the guide vane.

The face sheet 74 is affixed with the truss structure 66. For example, FIG. 4 depicts a portion of the truss structure 66 and face sheet 74. In this example, the truss structure 66 includes a recess 66a. The face sheet 74 is disposed in the recess 66a. The recess 66a is analogous in geometry to that of the face sheet 74 such that the exterior surface S1 of the face sheet 74 sits substantially flush with the exterior surface S2 of the truss structure 66 to provide a smooth aerodynamic profile. An adhesive 76 may be provided in the recess 66a to adhesively bond the face sheet 74 and the truss structure 66 together. Alternatively, the adhesive can be partially or fully eliminated by using a welding process to join the face sheet 74 to the truss structure 66 if these members are made from a thermoplastic material. Alternatively, the truss structure 66 may not have a recess, in which case the face sheets 74 will extend to the leading and trailing edges 62a/62b.

Figure 5:
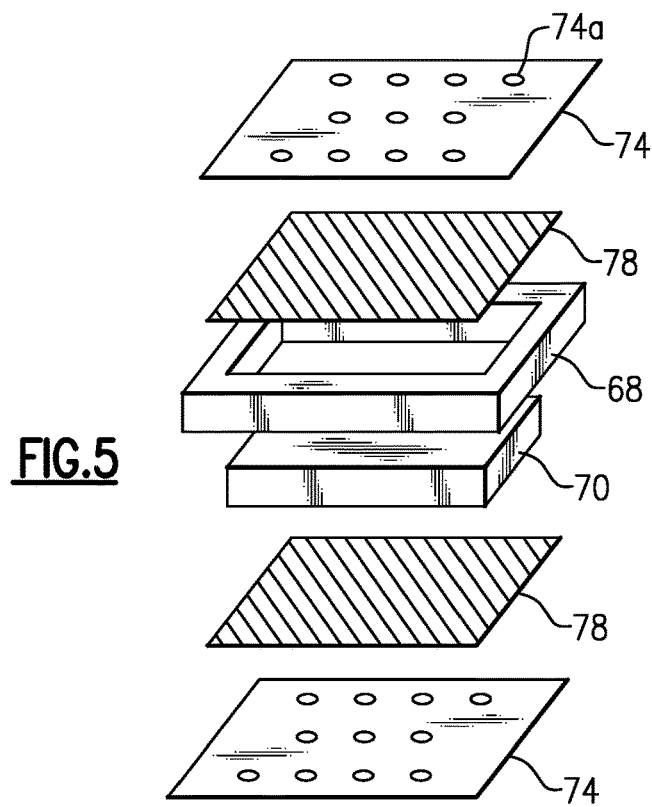
FIG. 5 illustrates an expanded view of a portion of the guide vane.

The honeycomb cells 72 can be incorporated into the airfoil mechanically or by additive manufacturing, for example. For mechanical incorporation, as shown in FIG. 5, a group of the honeycomb cells 72 are initially separate from the truss structure 66 and are then installed into the cavities 70. The outside perimeter of the group of honeycomb cells 72 may be pre-formed to a geometry that is analogous to the geometry of the through-cavity 70 in which it is to be installed. The face sheet 74 may be provided with an adhesive 78 that bonds the honeycomb cells 72 at their edges to the face sheet 74. For example, the adhesive bonding may utilize and adhesive reticulation in which a film adhesive is placed over the honeycomb cells 72 in a press and then heated. This subjects the film to gas pressure, which creates bubbles over the cells that subsequently rupture. The burst adhesive bubble then retracts to form a fillet along the cell edges, which then adheres the honeycomb walls to the face sheet 74.

Figure 6:
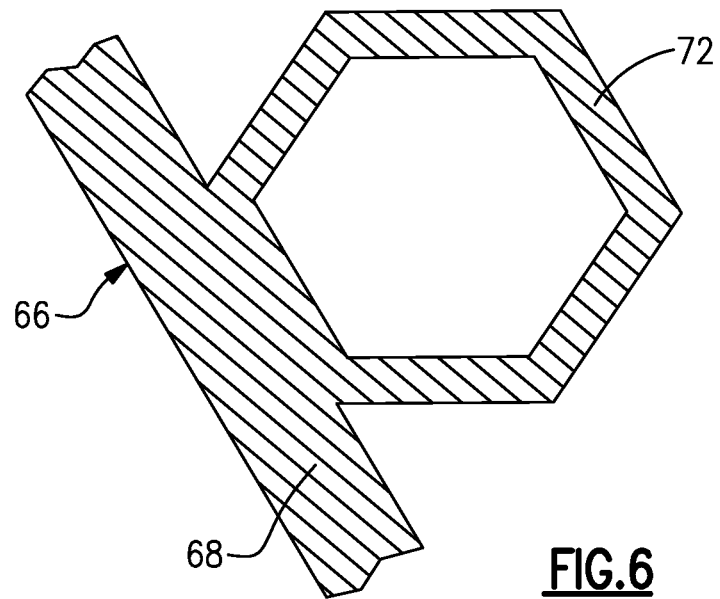
FIG. 6 illustrates a sectioned view through a monolithic truss structure and honeycomb cell.

Alternatively, the honeycomb cells 72 are formed using an additive manufacturing process. For example, FIG. 6 illustrates a representative one of the honeycomb cells 72 and ribs 68 of the truss structure 66. The honeycomb cell 72 and the truss structure 66 together form a monolithic piece. The monolithic piece is a single, continuous piece, as opposed to a collection of functional parts that are bonded, secured, fused together, or mechanically attached in joints. For example, the monolithic piece is formed in an additive manufacturing process fusing a starting powder together layer-by-layer in the desired geometry. Example additive manufacturing processes may include, but are not limited to, fused filament fabrication, powder bed fusion, stereo lithography, and directed energy deposition.

Figure 9:
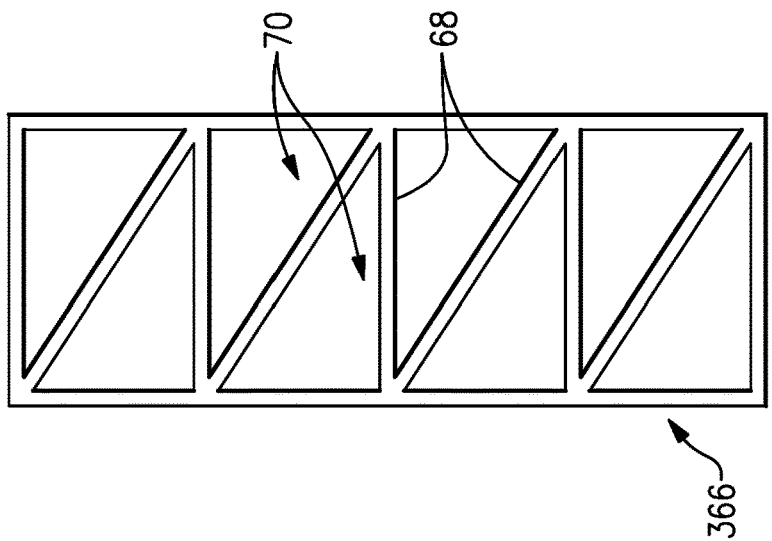
FIG. 9 illustrates another example configuration of a truss structure.
Figure 8:
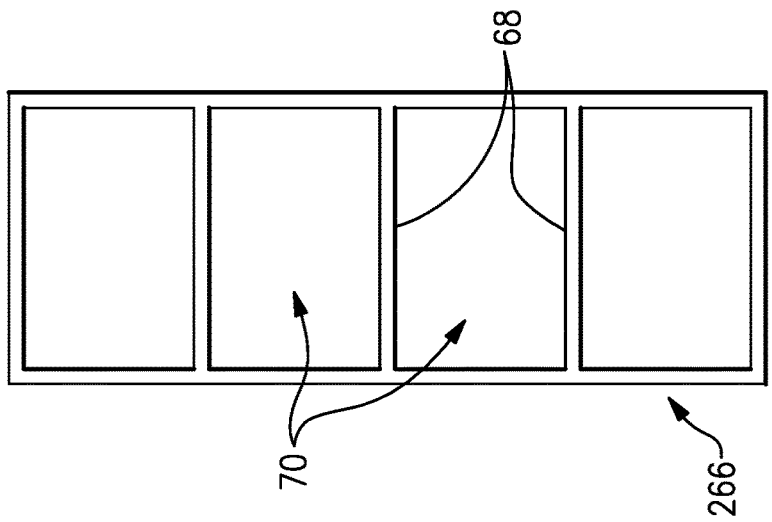
FIG. 8 illustrates another example configuration of a truss structure.
Figure 7:
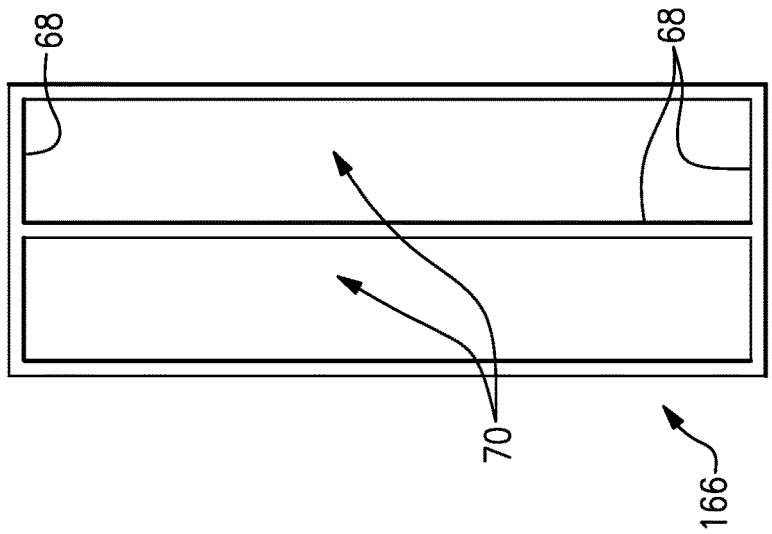
FIG. 7 illustrates another example configuration of a truss structure.

The perforations 74a in the face sheet(s) 74 and the honeycomb cells 72 serve to facilitate mitigation of audible acoustic frequencies. The mechanics of how such a structure mitigates acoustic frequencies is known and thus not described further herein. The vane 60 is also subject at least to loads during use, such as but not limited to, aerodynamic loads, aircraft maneuver loads, engine thrust loads, etc. While honeycomb structures may provide some load-bearing capability, it may be insufficient for the loads at hand. In this regard, the truss structure 66 is load-bearing and transmits a majority of the load applied on the vane 60 during use in the engine 20. As a result, the honeycomb cells 72 may be made to be light-weight, without substantial need for enhanced load-bearing strength because the truss structure 66 bears the loads. In this regard, the truss structure 66 can alternatively be provided in other configurations that provide load-bearing capability as well as an open cavity structure to accommodate honeycomb cells. FIGS. 7, 8, and 9 illustrate a few non-limiting examples of alternate geometries. It is to be understood that further examples of any of the examples above include these geometries. In FIG. 7, the truss structure 166 includes one radial rib 68 that connects radially inner and outer ribs 68 such that there are two through-cavities 70. In FIG. 8, the truss structure 266 includes axially-oriented ribs 68 that partition the truss structure 266 into four radially-stacked through-cavities 70. The truss structure 366 in FIG. 9 is a further variation of the truss structure 266 in FIG. 8. Here, the truss structure 366 additionally includes a sloped rib that further partitions each of the radially-stacked through-cavities 70 such that there are a total of eight through-cavities 70.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A vane comprising:
    an airfoil defining a leading edge, a trailing edge, a pressure side, and a suction side, the airfoil including a truss structure having ribs that interconnect with each other and that define there between a plurality of through-cavities from the pressure side to the suction side;
    honeycomb cells disposed in the plurality of through-cavities; wherein each honeycomb cell is defined by a closed-perimeter side wall; and
    a face sheet defining at least one of the pressure side or the suction side, the face sheet having perforations corresponding in location to the honeycomb cells.

2. The vane as recited in claim 1, wherein the truss structure is a reinforced polymer.

3. The vane as recited in claim 1, wherein the honeycomb cells are adhesively secured in the airfoil.

4. The vane as recited in claim 1, wherein the honeycomb cells and the truss structure are together a monolithic piece.

5. The vane as recited in claim 1, wherein the face sheet is adhesively bonded to the truss structure.

6. The vane as recited in claim 1, wherein the truss structure includes a recess, and the face sheet is disposed in the recess.

7. The vane as recited in claim 1, wherein the through-cavities of the plurality of through-cavities are each three or four-sided.

8. The vane as recited in claim 1, wherein the face sheet is a fiber reinforced polymer.

9. The vane as recited in claim 1, further including metallic or polymer end fittings.

10. The vane as recited in claim 1, wherein the ribs form three or four sides of each through-cavity of the plurality of through-cavities.

11. The vane as recited in claim 1, wherein the ribs circumscribe each through-cavity of the plurality of through-cavities.

12. The vane as recited in claim 1, wherein one side of each of the honeycomb cells is closed-off.

13. A gas turbine engine comprising:
a fan and a fan duct;
a compressor;
a turbine;
a combustor; and
a plurality of vanes disposed in the fan duct, each vane in the plurality of vanes including:
an airfoil defining a leading edge, a trailing edge, a pressure side, and a suction side, the airfoil including a truss structure having ribs that define there between a plurality of through-cavities from the pressure side to the suction side,
honeycomb cells disposed in the plurality of through-cavities, and
a face sheet defining at least one of the pressure side or the suction side, the face sheet having perforations corresponding in location to the honeycomb cells, wherein the truss structure includes a recess, and the face sheet is disposed in the recess.

14. The engine as recited in claim 13, wherein the truss structure and the face sheet are reinforced polymers.

15. The engine as recited in claim 13, wherein the honeycomb cells are adhesively secured in the airfoil.

16. The engine as recited in claim 13, wherein the honeycomb cells and the truss structure are together a monolithic piece.

17. The engine as recited in claim 13, wherein the face sheet is adhesively bonded to the truss structure.

18. A process for making a vane, comprising:
fabricating an airfoil, the airfoil defines a leading edge, a trailing edge, a pressure side, and a suction side, the airfoil has a truss structure with ribs that interconnect with each other and that define there between a plurality of through-cavities from the pressure side to the suction side, with honeycomb cells disposed in the plurality of through-cavities, and a face sheet that defines at least one of the pressure side or the suction side, the face sheet has perforations that correspond in location to the honeycomb cells, wherein the truss structure includes a recess, and the face sheet is disposed in the recess.

19. The process as recited in claim 18, wherein the fabricating includes forming the truss structure and the honeycomb cells by additive manufacturing.

20. The process as recited in claim 18, wherein the fabricating includes bonding the face sheet to the truss structure.

* * * * *